United States Patent
Al-Somali et al.

(10) Patent No.: US 11,346,194 B2
(45) Date of Patent: May 31, 2022

(54) HYDRAULIC Y-TOOL SYSTEM

(71) Applicant: SAUDI ARABIAN OIL COMPANY, Dhahran (SA)

(72) Inventors: Abdullah Ahmed Al-Somali, Dhahran (SA); Saeed Mohamed Al-Ghamdi, Dammam (SA); Fahad Abdulaziz Al-Shinaiber, Al Khobar (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/016,817

(22) Filed: Sep. 10, 2020

(65) Prior Publication Data

US 2022/0074290 A1    Mar. 10, 2022

(51) Int. Cl.
*E21B 43/12* (2006.01)
*E21B 34/08* (2006.01)
*F16K 1/18* (2006.01)

(52) U.S. Cl.
CPC ............ *E21B 43/128* (2013.01); *E21B 34/08* (2013.01); *F16K 1/18* (2013.01); *E21B 2200/05* (2020.05)

(58) Field of Classification Search
CPC .... E21B 43/128; E21B 34/08; E21B 2200/05; E21B 43/121; E21B 43/129; F16K 1/18
See application file for complete search history.

(56) References Cited

U.S. PATENT DOCUMENTS

| | | | | |
|---|---|---|---|---|
| 5,154,228 A | * | 10/1992 | Gambertoglio | E21B 34/12 166/124 |
| 5,971,072 A | * | 10/1999 | Huber | E21B 17/028 166/297 |
| 5,975,209 A | | 11/1999 | McCorry | |
| 6,497,278 B1 | * | 12/2002 | Norris | E21B 34/066 166/242.3 |

(Continued)

FOREIGN PATENT DOCUMENTS

| | | |
|---|---|---|
| GB | 2288197 A | 10/1995 |
| WO | 2007083192 A1 | 7/2007 |
| WO | 2016040220 A1 | 3/2016 |

OTHER PUBLICATIONS

International Search Report and Written Opinion of the International Searching Authority issued in corresponding International Application No. PCT/US2020/055323, dated May 11, 2021 (14 pages).

*Primary Examiner* — Michael R Wills, III
(74) *Attorney, Agent, or Firm* — Osha Bergman Watanabe & Burton LLP

(57) ABSTRACT

A submersible pump system includes a Y-tool system including a Y-Block having a production tubing branch, a submersible pump branch, and a bypass branch, an electrical submersible pump coupled to the submersible pump branch, a valve assembly coupled to the bypass branch, and a hydraulic system coupled to the valve assembly, the hydraulic system providing a hydraulic fluid to a chamber of the valve assembly. A method includes lowering production (Continued)

tubing into a wellbore, the production tubing including a submersible pump system with a Y-tool system including a Y-Block, and actuating a valve assembly disposed in a bypass tubing coupled to a bypass branch of the Y-Block to open or close a bore of the bypass tubing, the actuating including providing a hydraulic fluid to a chamber of the valve assembly.

20 Claims, 3 Drawing Sheets

(56) References Cited

U.S. PATENT DOCUMENTS

| | | | |
|---|---|---|---|
| 6,508,308 B1* | 1/2003 | Shaw | E21B 43/128 |
| | | | 166/313 |
| 7,363,983 B2* | 4/2008 | Martinez | E21B 43/122 |
| | | | 166/105 |
| 8,104,540 B2 | 1/2012 | Leitch | |
| 8,316,938 B2* | 11/2012 | Al-Jarri | E21B 43/20 |
| | | | 166/265 |
| 9,303,496 B2 | 4/2016 | Xiao et al. | |
| 10,167,708 B2 | 1/2019 | Beveridge | |
| 2004/0060707 A1 | 4/2004 | Bearden et al. | |
| 2006/0231256 A1 | 10/2006 | Rivas et al. | |
| 2009/0200034 A1 | 8/2009 | Leitch | |
| 2015/0114662 A1 | 4/2015 | Hendryx | |
| 2017/0306732 A1 | 10/2017 | Beveridge | |
| 2020/0355047 A1* | 11/2020 | Abdellatief | E21B 37/00 |

* cited by examiner

401
Lowering production tubing into a well bore, the production tubing including a submersible pump system, the submersible pump system having a Y-tool system including a Y-Block, an electrical submersible pump coupled to a submersible pump branch of the Y-Block, and a valve assembly disposed in a bypass tubing coupled to a bypass branch of the Y-Block 403
Actuating the valve assembly to open or close a bore of the bypass tubing coupled to the bypass branch of the Y-Block, the actuating including providing a hydraulic fluid to a chamber of the valve assembly

FIG. 4

505
Lowering a production tubing into a wellbore

507
Providing power to an ESP coupled to a Y-tool system and production tubing via an electrical cable coupled to a power source 509
Providing hydraulic fluid to a valve assembly disposed in a bypass tubing coupled to the Y-Block 511
Moving a sliding sleeve of the valve assembly in response to the providing hydraulic fluid 513
Opening a valve element of the valve assembly in response to the moving the sliding sleeve 515
Withdrawing the hydraulic fluid from the valve assembly 517
Moving the sliding sleeve of the valve assembly in an opposite direction 519
Closing the valve element of the valve assembly in response to the moving the sliding sleeve in the opposite direction

FIG. 5

HYDRAULIC Y-TOOL SYSTEM

BACKGROUND

Artificial lift systems are used in wells to increase the production rate from the wells that lack sufficient internal pressure for natural production. Artificial lift systems may include, for example, a positive-displacement downhole pump or an electrical submersible pump (ESP). An ESP generally includes a centrifugal pump, a motor, an electrical power cable connected to the motor, and surface controls (switchboards/variable speed drives). A seal chamber section may be coupled to the motor. The centrifugal pump, the seal chamber, and the motor are usually hung on tubing or pipe known as a production tubing string from a wellhead with the pump located axially above the motor; however, in certain applications, the motor may be located above the pump.

The ESP is suspended in the well from the bottom of the production tubing to a location near the well perforation. Multiple ESPs may be installed in the production tubing, such that a Y-Block supports each ESP at various locations along the production tubing. The well producing formation may be isolated by a packer or plug located in the wellbore above or below the producing formation. The pump of the ESP is operated to retrieve fluid from the producing formation, increase the pressure of the fluid, and discharge the pressurized fluid into the production tubing. Pressurized fluid in the production tubing rises to the surface due to differences in pressure.

ESP systems may be connected with a Y-tool system which mainly includes of a Y-Block connecting with a bypass system used to provide access to the wellbore below the ESP without the need of retrieving the ESP. A top side of the Y-Block is connected to the production tubing and the lower side is connected to two separate conduits. Specifically, the first conduit (bypass) is concentric with the production tubing and provides access to the wellbore below the ESP. The second conduit is offset from the production tubing and supports the ESP.

SUMMARY

In one aspect, embodiments disclosed herein relate to a submersible pump system that includes a Y-tool system including a Y-Block having a production tubing branch, a submersible pump branch, and a bypass branch, an electrical submersible pump coupled to the submersible pump branch, a valve assembly coupled to the bypass branch, the valve assembly including a tubular, a sliding sleeve disposed in the tubular, a chamber formed between the sliding sleeve and the tubular, a flapper positioned proximate a first end of the sliding sleeve, the flapper movable between a closed position and an open position in response to a movement of the sliding sleeve, a spring disposed around the sliding sleeve, and a hydraulic system coupled to the valve assembly, the hydraulic system providing a hydraulic fluid to the chamber.

In another aspect, embodiments disclosed herein relate to a method including lowering production tubing into a wellbore, the production tubing including a submersible pump system, the submersible pump system comprising a Y-tool system including a Y-Block, an electrical submersible pump coupled to a submersible pump branch of the Y-Block, and a valve assembly disposed in a bypass tubing coupled to a bypass branch of the Y-Block, and actuating the valve assembly to open or close a bore of the bypass tubing coupled to the bypass branch of the Y-Block, the actuating comprising providing a hydraulic fluid to a chamber of the valve assembly.

In another aspect, embodiments disclosed herein relate to a submersible pump system including a Y-tool system including a Y-Block having a production tubing branch, a submersible pump branch, and a bypass branch, an electrical submersible pump coupled to the submersible pump branch, a bypass tubing coupled to the bypass branch, and a hydraulically actuated valve assembly disposed in the bypass tubing, the valve assembly including a sliding sleeve, and a valve element positioned proximate a first end of the sliding sleeve, the valve element movable between a closed position and an open position in response to a movement of the sliding sleeve.

Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 4 is a flow chart of a method in accordance with embodiments disclosed herein.

FIG. 5 is a flow chart of a method in accordance with embodiments disclosed herein.

DETAILED DESCRIPTION

Figure 1:
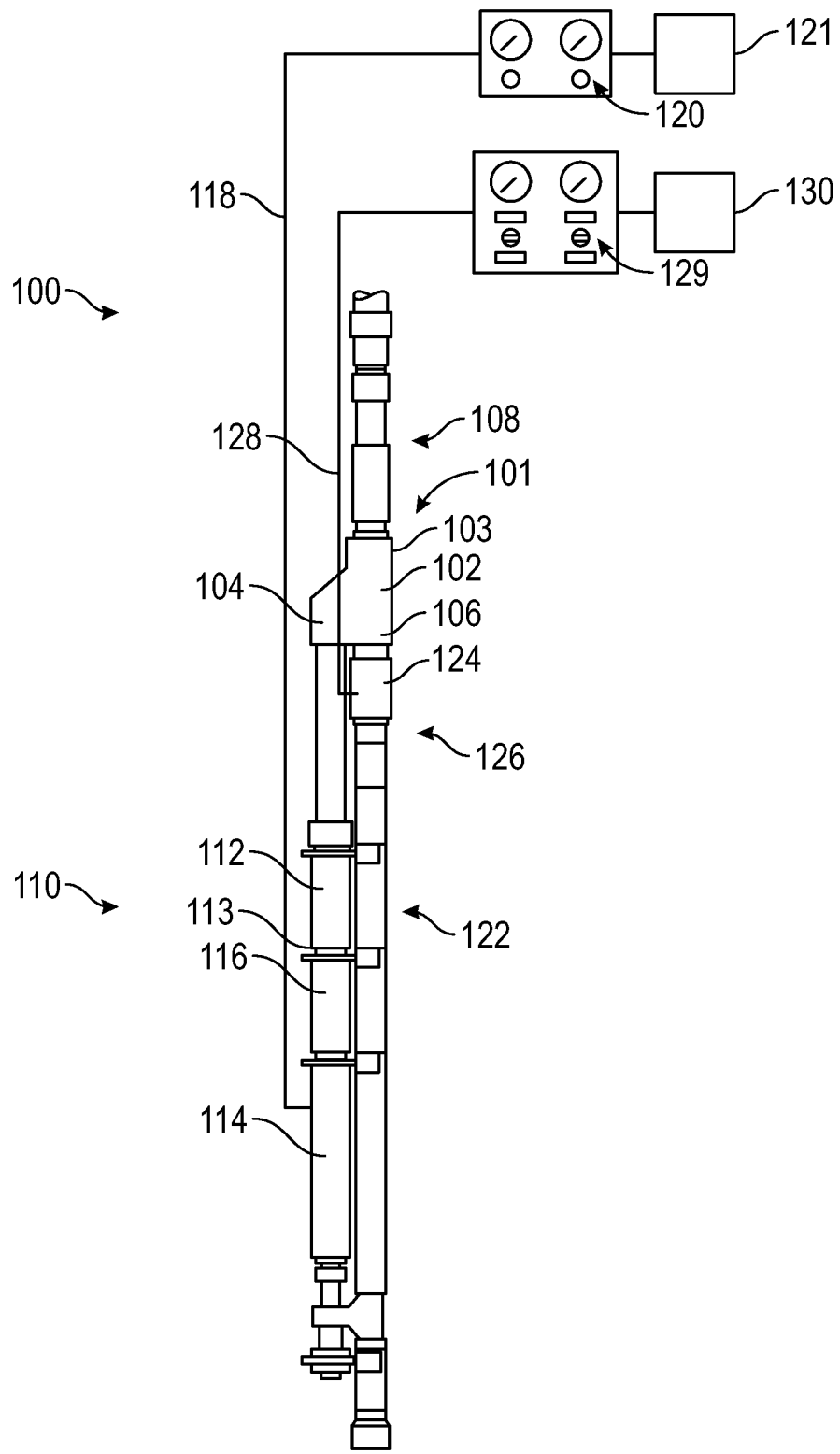
FIG. 1 is a schematic of a submersible pump system in accordance with embodiments disclosed herein.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. For the sake of continuity, and in the interest of conciseness, same or similar reference characters may be used for same or similar objects in multiple figures.

Embodiments disclosed herein are directed to submersible pump systems that include a Y-Block for providing two separate conduits below the Y-Block, namely a submersible pump tubing and a bypass tubing. More specifically, embodiments disclosed herein are directed to a submersible pump system with a Y-tool system and a hydraulic system that opens and closes access through the bypass tubing.

In accordance with one or more embodiments, a submersible pump system includes a Y-Block having a production branch, a submersible pump branch, and a bypass branch. The production branch is coupled to production tubing suspended from the wellhead. An electrical submersible pump is coupled to the submersible pump branch of the Y-Block and bypass tubing is coupled to the bypass branch. A valve assembly is coupled to the bypass branch and may be installed within the bypass tubing or a component of the bypass tubing. A hydraulic system is coupled to the valve assembly to provide hydraulic fluid to a chamber of the valve assembly to open or close the valve assembly, thereby allowing or closing access through the bypass branch.

Further, embodiments disclosed herein relate to methods of producing fluid from a well, the method including lowering production tubing into a wellbore, the production tubing including a submersible pump system, the submersible pump system having a Y-Block, an electrical submersible pump coupled to a submersible pump branch of the Y-Block and a valve assembly coupled to a bypass branch of the Y-Block. The method also includes actuating the valve assembly to open or close a bore of a bypass tubing coupled to the bypass branch of the Y-Block, the actuating comprising providing a hydraulic fluid to a chamber of the valve assembly.

Referring to FIG. 1, a submersible pump system 100 in accordance with embodiments disclosed herein is shown. The submersible pump system 100 includes a Y-tool system 101 which primarily includes a Y-Block 102 having a production tubing branch 103, a submersible pump branch 104 and a bypass branch 106. As shown, the Y-Block 102 has a general shape consistent with an inverted letter "Y". The production tubing branch 103 is configured to couple to production tubing 108 suspended from the wellhead (not shown). The submersible pump system 100 also includes a pump 112, such as an electrical submersible pump (ESP) 110, coupled to the submersible pump branch 104. The ESP 110 extends generally parallel to bypass tubing 122 coupled to the bypass branch 106 of the Y-Block 102.

The ESP 110 may include a pump 112, such as a multistage centrifugal pump, with one or more fluid intakes 113, a motor 114, and a seal section 116. Each stage of the centrifugal pump includes an impeller (not shown) and a diffuser (not shown). The seal section 116 may include a mechanical seal (not shown) that sealingly couples the motor 114 and the pump 112 and prevents well fluids from entering the motor 114. The ESP may also include a gas separator to remove gases from the fluid and send the gases uphole through the annulus between the casing and the production tubing rather than through the pump 112.

An electrical power cable 118 is coupled to the motor to provide power to the motor 114 from a power source to run the pump 112. For example, three-phase electrical power may be provided from a power source at the surface of the well down to the motor 114 to rotate the pump 112. Surface controls 120 (e.g., switchboards/variable speed drives) at the surface of the well may control starting up and shutting down of the ESP 110.

The ESP 110 may be operated manually or automatically in response to a measured parameter signal sensed from a downhole sensor or tool. Upon operation, the motor rotates the pump 112 which draws reservoir fluids into the pump 112 through the fluid intake(s) 113. As the impeller (not shown) rotates within the diffuser of each stage of the pump 112, the velocity of the fluid is reduced and the pressure is increased. Fluid is discharged into a space formed in a pump casing and fed into the next impeller of the next stage. The number of stages of the pump 112 may be pre-selected based on a desired increase in pressure of the fluid. Fluid is discharged from the last stage, exits the pump 112, and travels up through the Y-Block 102 and into the production tubing 108 to the surface of the well.

When the ESP 110 is turned off, the well fluid may be bypassed via the bypass tubing 122. Thus, various production zones may be selectively accessed from the surface of the well through the bypass tubing 122. In some embodiments, the production zones may be accessed with equipment, such as logging equipment, repair equipment, etc., through the bypass tubing 122. In accordance with embodiments disclosed herein, the submersible pump system 100 includes a valve assembly 124 coupled to the bypass branch 106 of the Y-Block 102 to provide selective access to one or more production zones through the bypass tubing 122. As shown in FIG. 1, the valve assembly 124 may be positioned directly below the Y-Block 102. In one or more embodiments, the valve assembly 124 may be disposed within a nipple 126 coupled to the bypass branch 106 of the Y-Block 102.

The valve assembly 124 includes a valve member that may be opened to allow fluid flow or equipment access through a central bore of the valve assembly 124 or closed to block fluid flow or equipment access through the bore of the valve assembly 124. Thus, the valve assembly 124 controls fluid flow through the bypass tubing 122. In accordance with embodiments disclosed herein, a hydraulic line 128 is coupled between a hydraulic fluid source 130 and the valve assembly 124 such that the valve member is moved in response to hydraulic pressure or a hydraulic pressure signal. In one or more embodiments, valve assembly 124 may be a wireline or tubing retrieval valve including, for example, a flapper or ball valve element. In or more embodiments, valve assembly 124 may be a hydraulically actuated subsurface safety valve (SSSV).

Figure 2:
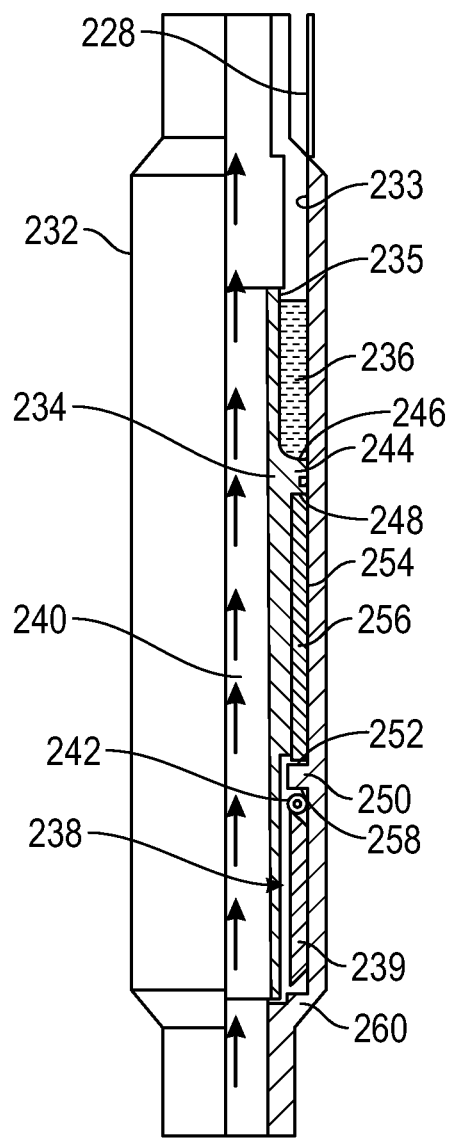
FIG. 2 is a schematic of a valve assembly, partially broken away, in an open position, in accordance with embodiments disclosed herein.
Figure 3:
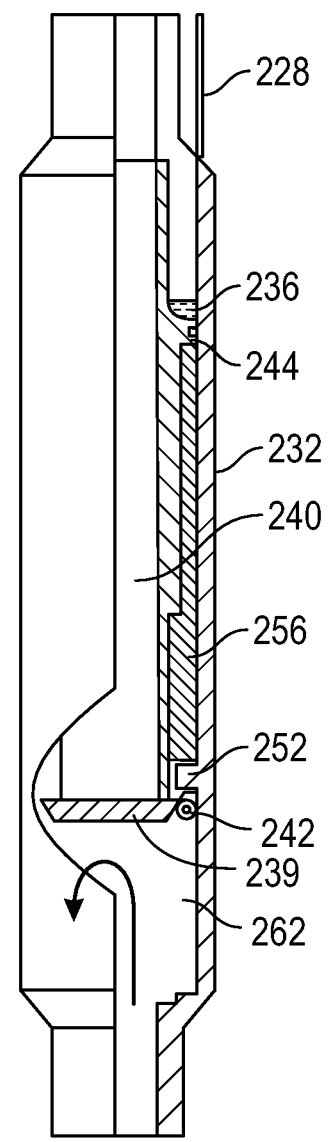
FIG. 3 is a schematic of the valve assembly of FIG. 2, partially broken away, in a closed position, in accordance with embodiments disclosed herein.

FIGS. 2 and 3 are schematics of a valve assembly 224, partially broken away, in open and closed positions, in accordance with embodiments disclosed herein. FIG. 2 shows the valve assembly 224 in an open position, and FIG. 3 shows the valve assembly 224 in a closed position.

Valve assembly 224 includes a tubular 232 with a sliding sleeve 234 disposed therein. In one or more embodiments the tubular 232 may be positioned concentrically around the sliding sleeve 234. A chamber 236 is formed between an outer surface 235 of the sliding sleeve 234 and an inner surface 233 of the tubular 232. The valve assembly 224 includes a valve element 238 that is movable between a closed position (FIG. 3) and an open position (FIG. 2). As shown, in a closed position, the valve element 238 is moved over an end of the sliding sleeve 234, thereby covering and blocking the bore 240 of the sliding sleeve 234 and the valve assembly 224. In an open position, the valve element 238 is moved to uncover and unblock the bore of the sliding sleeve 234. In the open position, fluid flow up through the bore 240 is allowed (as indicated by the arrows). As shown in FIGS. 2 and 3, in one or more embodiments, the valve element 238 may be a flapper 239 coupled to a hinge 242. In one or more embodiments, the hinge 242 may be a spring-loaded hinge so as to bias the flapper 239 in a particular position, e.g., to bias the flapper 239 in a closed position (FIG. 3). In one or more embodiments, the flapper 239 may have a circular shape in plan view. A diameter of the flapper may be greater than a diameter of the bore 240 of the sliding sleeve 234. Thus, when the flapper 239 is moved over the end of the sliding sleeve 234, the flapper 239 completely closes and seals against the end of the sliding sleeve 234 to close the bore 240. In other embodiments, the valve element 238 may be a ball valve element configured to rotate between a first position in which a bore is aligned with the bore 240 of the sliding sleeve 234, and a second position in which the bore is misaligned with the bore of the sliding sleeve 234 thereby blocking and sealing the bore 240.

Sliding sleeve 234 may include a shoulder 244 formed on the outer surface 235 and extending radially outward. The shoulder 244 includes an outer face that contacts and seals against the inner surface 233 of the tubular 232. In some embodiments, a seal may be provided between the outer face of the shoulder 244 of the sliding sleeve 234 and the inner surface 233 of the tubular 232. A first surface 246 of the shoulder 244 may define the chamber 236. Chamber 236 may be a hydraulic chamber configured to fill and empty with a hydraulic fluid. Hydraulic line 228 may be coupled to an end of tubular 232 and in fluid communication with chamber 236 to provide hydraulic fluid from a hydraulic fluid source 130 (FIG. 1) in response to hydraulic fluid controls 129 (FIG. 1).

Tubular 232 may include a first shoulder 250 formed on an inner surface 233 and extending radially inward. The shoulder 244 of the sliding sleeve 234 may be spaced an axial distance from the first shoulder 250 of the tubular 232 and radially overlap one another, thereby defining a compartment 254 between the two shoulders 244 and 250. A spring 256 may be disposed around the sliding sleeve 234 between the shoulder 244 of the sliding sleeve and the first shoulder 250 of the tubular 232. A first end of the spring 256 may contact a second surface 248 of the shoulder 244 of the sliding sleeve 234 and a second end of the spring 256 may contact an opposing surface, a first surface 252 of first shoulder 250 of tubular 232. The second surface 248 of the shoulder 244 of the sliding sleeve 234 may be opposite the first surface 246 of the shoulder 244, such that the first and the second surfaces 246, 248 face is opposing directions. For example, as shown, the first surface 246 may face axially uphole, while the second surface 248 may face axially downhole. Relative movement of the sliding sleeve 234 with respect to the tubular 232 increases and decreases an axial length of the compartment 254. As the axial length of the compartment 254 decreases and increases, the spring 256 may be compressed and expanded, respectively. In one or more embodiments, the spring 256 may be a power spring.

In one or more embodiments, the first shoulder 250 of tubular 232 may include a second surface 258 opposite the first surface 252 of the first shoulder 250. For example, as shown, the first surface 252 may face axially uphole while the second surface 258 may face axially downhole. The second face 258 may face a second shoulder 260 formed in the tubular 232 an axial distance from the first shoulder 250. A space defining a pocket 262 is formed between the first shoulder 250 and the second shoulder 260 of the tubular 232. The pocket 262 is sized to house or contain the flapper 239 when the flapper is moved into the open position by the sliding sleeve 234.

Referring to FIG. 2, the valve assembly 224 is shown in the open position with the flapper 239 positioned in a vertical or axial orientation with respect to the valve assembly 224 in accordance with one or more embodiments disclosed herein. As shown, the sliding sleeve 234 may be positioned radially inward of the flapper 239 when the valve assembly 224 is in the open position. As discussed in more detail below, axial movement of the sliding sleeve 224 (e.g., axially downhole movement) moves the flapper 239 into the pocket 262 formed in the inner surface 233 of the tubular 232. In one or more embodiments, as shown in FIG. 2, the sliding sleeve 234 is in an axially downward position in the open position. In this position, the shoulder 244 of the sliding sleeve 234 is configured to compress the spring 256 in the compartment 254 against the first shoulder 250 of the tubular 232. Additionally, the chamber 236 for hydraulic fluid has an increased volume as compared to the volume of the chamber 236 in the closed position (FIG. 3). In the open position, fluid may flow up through the bore 240 of the valve assembly 224 and sliding sleeve 234, thereby allowing fluid flow (as indicated by arrows) through the bypass tubing 122 (FIG. 1) coupled to the Y-Block 102 (FIG. 1) of the submersible pump system 100 (FIG. 1). Additionally, the open position may allow for tools or equipment to be passed down through the bypass tubing 122 (FIG. 1) to reach a desired production zone.

Referring to FIG. 3, the valve assembly 224 is shown in the closed position with the flapper 239 positioned in a horizontal or transverse orientation with respect to the valve assembly 224 in accordance with one or more embodiments disclosed herein. As shown, in the closed position, the sliding sleeve 234 is moved an axial distance with respect to the open position (FIG. 2), such that the sliding sleeve 234 is not positioned radially inward of the flapper 239. The flapper 239 is therefore allowed to be positioned across the end of the sliding sleeve 234, thereby covering the bore 240 of the sliding sleeve 234. In one or more embodiments, the flapper 239 is configured to rotate around the hinge 242. The hinge 242 may be spring-loaded such that when the sliding sleeve 234 is moved to the closed position, the spring-loaded hinge 242 causes the flapper 239 to rotate from the open position in pocket 262 of tubular 232 (FIG. 1) to the transverse position (FIG. 3) closing the bore 240. In one or more embodiments, as shown in FIG. 3, the sliding sleeve 234 is in an axial upward position when the flapper 239 is in a closed position. In this position, the axial length of the compartment 254 for the spring 256 may be increased as compared to the axial length of the compartment 254 in the open position (FIG. 2) as the restoring force of the spring 256 helps move the sliding sleeve 234 axially uphole. Additionally, the volume of the chamber 236 is smaller than the volume of the chamber 236 in the open position (FIG. 2). Thus, as hydraulic fluid is removed from the chamber 236, the spring 256 acts on the second face 248 of the shoulder 244 of the sliding sleeve 234 and the first face 252 of the first shoulder 250 of the tubular 232 to move the sliding sleeve 234 axially uphole, allowing the flapper 239 to close. Although embodiments disclosed herein refer to axially upward or uphole and axially downward or downhole positions, one of ordinary skill in the art will appreciate that these positions may be switched such that the locations and movements of the components are in the opposition direction without departing from the scope of embodiments disclosed herein.

Referring to FIGS. 1-3, in one or more embodiments, the valve assembly 224 may be disposed in a nipple 126 coupled to the bypass branch 106 of the Y-Block 102. In one embodiment, the tubular 232 in FIGS. 2 and 3 may be the nipple 126. In one or more embodiments, a bore of the nipple 126 or tubular 232 may be between approximately 3.5" (8.8 cm) to 4.5" (11.4 cm) and the bore 240 of the valve assembly 224 (i.e., the bore of the sliding sleeve 234) may be between approximately 1.5" (3.8 cm) and 2.12" (5.38 cm). Thus, a valve assembly 224 in accordance with embodiments disclosed herein may accommodate coil tubing for logging activities having an outer diameter of between approximately 1.5" (3.8 cm) and 2.0" (5.0 cm). These dimensions are provided as an non-limiting example and do not limit the scope of embodiments disclosed herein.

A method of operating a submersible pump system in accordance with one or more embodiments, as shown in FIG. 4, includes lowering a production tubing into a wellbore, the production tubing including a submersible pump system, indicated at 401. The submersible pump system includes a Y-Block, an ESP coupled to a submersible pump branch of the Y-Block, and a valve assembly coupled to a bypass branch of the Y-Block as discussed above with reference to FIGS. 1-3. The method further includes actuating the valve assembly to open or close a bore of a bypass tubing coupled to the bypass branch of the Y-Block, as indicated at 403. Actuating the valve assembly includes providing a hydraulic fluid to a chamber of the valve assembly. Actuating the valve assembly may also include withdrawing a hydraulic fluid from the chamber of the valve assembly.

The ESP may be selectively operated via an electrical cable coupled between the ESP and a power source. Actuating the valve assembly may include axially moving a sliding sleeve of the valve assembly against a valve member of the valve assembly, and moving the valve member into an open position. The sliding sleeve is hydraulically actuated by the hydraulic fluid provided to the chamber of the valve assembly. The valve member may move into an open position by rotating the valve member, e.g. a flapper, about a hinge. When the hydraulic fluid is withdrawn from the chamber of the valve assembly, the sliding sleeve moves axially in an opposite direct and the valve element of the valve assembly is moved to a closed position.

FIG. 5 shows a method of opening or closing a bypass tubing of a submersible pump system in accordance with embodiments disclosed herein. The method includes lowering a production tubing into a wellbore, as indicated at 505. Referring to FIGS. 1-3 in combination with FIG. 5, the production tubing 108 may include a submersible pump system 100 as described above. In accordance with one or more embodiments disclosed herein, the submersible pump system 100 includes an ESP 110 coupled to a submersible pump branch 104 of a Y-Block 102 and a bypass tubing 122 coupled to a bypass branch 106 of the Y-Block 102. The production tubing branch 103 of the Y-Block 102 is configured to couple to production tubing 108 suspended from the wellhead (not shown).

Power is provided to the ESP 110 coupled to the Y-tool system 101 and production tubing 108 via an electrical cable 118 coupled to a power source 121, as indicated at 507. Surface control 120 at the surface of the well may control the ESP 110 during the startups and shutdowns.

Hydraulic fluid is provided to a valve assembly 124, 224 disposed in the bypass tubing 122 coupled to the Y-Block 102, as indicated at 509. For example, a hydraulic line 128 may be coupled between a hydraulic fluid source 130 and the valve assembly 124, 224. More specifically, the hydraulic line 128 is in fluid communication with the chamber 236 formed in the valve assembly 124, 224. Hydraulic fluid from the hydraulic line 128 may fill the chamber 236 in response to hydraulic fluid control 129 to actuate the valve assembly 124, 224.

The hydraulic fluid is used to actuate or de-actuate (e.g., open and close) the valve assembly 124, 224. In response to the hydraulic fluid provided to the valve assembly 124, 224, a sliding sleeve 234 of the valve assembly 224 is moved, as indicated at 511. For example, the sliding sleeve 234 may be moved axially uphole or downhole within the valve assembly in response to a volume of hydraulic fluid provided to the chamber 236. As shown, the chamber 236 is in fluid communication with the sliding sleeve 234, such that, in accordance with one or more embodiments, as the chamber 236 is filled with hydraulic fluid, the sliding sleeve 234 is moved axially downhole, thereby increasing the volume of chamber 236.

Movement of the sliding sleeve 234 moves a valve element 238 of the valve assembly 224 to open the valve element 238, as indicated at 513. For example, the sliding sleeve 234 may move into physical contact with the valve element 238. In one or more embodiments, the valve element 238 may be a flapper or a ball element. Thus, the sliding sleeve 234 and therefore the valve element 238 are moved in response to hydraulic pressure or a hydraulic pressure signal. As the sliding sleeve 234 moves axially downward, the shoulder 244 of the sliding sleeve 234 also moves axially downward and compresses the spring 256 disposed around the sliding sleeve 234 in the compartment 254 against the first shoulder 250 of the tubular 232 of the valve assembly 224.

In one or more embodiments, the valve member 238 is a flapper 239 coupled to a hinge 242. The hinge 242 may be a spring-loaded hinge so as to bias the flapper 239 in a particular position, e.g., to bias the flapper 239 in a closed position (FIG. 3). Thus opening the valve element 238 of the valve assembly 224 may include moving the sliding sleeve 234 axially downhole, thereby moving the flapper 239 around the spring-loaded hinge 242. As shown, the sliding sleeve 234 may move to a position radially inward of the flapper 239, thereby moving the flapper 239 to the open position and maintaining the flapper 239 in the open position through contact forces. The hydraulic pressure applied to the sliding sleeve 234 may therefore be increased to a pressure greater than the pressure applied by the spring-loaded hinge 242 to the flapper 239. The movement of the sliding sleeve 234 thereby moves the valve element 238 to the open position.

In the open position, reservoir fluid may flow up through the bore 240 of the valve assembly 224 and sliding sleeve 234, thereby allowing fluid flow (as indicated by arrows) through the bypass tubing 122. Additionally, the open position may allow for tools or equipment to be passed down through the bypass tubing 122 to reach a desired production zone.

Hydraulic fluid may be withdrawn from the chamber 236 in the valve assembly 124, 224, as indicated at 515. As the volume of the chamber 236 gets smaller, the sliding sleeve 234 moves in an opposite direction from the movement which opened the valve assembly 224, as indicated at 517. For example, hydraulic fluid may be withdrawn from the chamber 236 via the hydraulic line 128, 228, thereby causing the sliding sleeve 234 to move axially uphole. In this position, the axial length of the compartment 254 for the spring 256 is increased as compared to the axial length of the compartment 254 in the open position (FIG. 2). Additionally, the volume of the chamber 236 is smaller than the volume of the chamber 236 in the open position (FIG. 2). Thus, as hydraulic fluid is removed from the chamber 236, the compressed spring 256 acts on the second face 248 of the shoulder 244 of the sliding sleeve 234 and the first face 252 of the first shoulder 250 of the tubular 232 to facilitate and ensure movement of the sliding sleeve 234 axially uphole.

The valve element 238 may then be moved to the closed position in response to the movement of the sliding sleeve 234 in the opposite direction, as indicated at 519. For example, as the sliding sleeve 234 moves axially upward, the force applied by the sliding sleeve 234 on the flapper 239 decreases to a value less than the value of the force applied by the spring-loaded hinge 242 on the flapper 239. Thus, the flapper 239 rotates about the spring loaded hinge 242 moving the flapper into a transverse position across the bore 240 of the sliding sleeve 234, thereby closing the bore of the valve assembly 224 and the bypass tubing 122.

An apparatus or method in accordance with embodiments disclosed herein may advantageously allow for selective opening and closing of a bypass tubing coupled to a Y-Block of a submersible pump system. A submersible pump system in accordance with embodiments disclosed herein may eliminate the need of a wireline for installing and removing a blanking plug during logging activities. Additionally, embodiments disclosed herein may provide a more reliable and less complicated mechanism for opening and closing a bypass tubing of a submersible pump system by providing an electrically powered ESP and a hydraulically operated valve assembly disposed in a bypass tubing. Furthermore, the hydraulically operated valve assembly in accordance with embodiments disclosed herein may provide a better and more reliable seal.

While the method and apparatus have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A submersible pump system comprising:
   a Y-tool system including a Y-Block having a production tubing branch, a submersible pump branch, and a bypass branch;
   an electrical submersible pump coupled to the submersible pump branch;
   a valve assembly disposed in the bypass branch, the valve assembly comprising:
      a tubular;
      a sliding sleeve disposed in the tubular, a chamber formed between the sliding sleeve and the tubular;
      a flapper positioned proximate a first end of the sliding sleeve, the flapper movable between a closed position and an open position in response to a movement of the sliding sleeve; and
      a spring disposed around the sliding sleeve; and
   a hydraulic system, independent of the electrical submersible pump, coupled to the valve assembly, the hydraulic system providing a hydraulic fluid to the chamber.

2. The submersible pump system of claim 1, wherein the tubular comprises a nipple coupled to the bypass branch of the Y-Block, and wherein the valve assembly is disposed in the nipple.

3. The submersible pump system of claim 1, wherein the valve assembly is a subsurface safety valve.

4. The submersible pump system of claim 1, wherein the flapper comprises a diameter greater than a diameter of a bore of the sliding sleeve.

5. The submersible pump system of claim 1, wherein the sliding sleeve includes a shoulder extending radially outward from an outer surface of the sliding sleeve, and the tubular includes a shoulder extending radially inward from an inner surface of the tubular, wherein an axial space between the shoulder of the sliding sleeve and the shoulder of the tubular defines a spring compartment.

6. The submersible pump system of claim 5, wherein the shoulder of the sliding sleeve defines a lower surface of the chamber.

7. The submersible pump system of claim 1, wherein the hydraulic system comprises a hydraulic line coupled between the valve assembly and a hydraulic fluid source.

8. The submersible pump system of claim 1, wherein the hydraulic system comprises a hydraulic control panel disposed at a surface of the well.

9. A method comprising:
   lowering production tubing into a wellbore, the production tubing including a submersible pump system, the submersible pump system comprising a Y-tool system including a Y-Block, an electrical submersible pump coupled to a submersible pump branch of the Y-Block, and a valve assembly disposed in a bypass tubing coupled to a bypass branch of the Y-Block;
   operating electrically the electrical submersible pump; and
   actuating the valve assembly to open or close a bore of the bypass tubing coupled to the bypass branch of the Y-Block, the actuating comprising providing a hydraulic fluid to a chamber of the valve assembly, wherein the providing the hydraulic fluid to the chamber of the valve assembly is independent of the operating electrically the electrical submersible pump.

10. The method of claim 9, wherein the operating electrically the electrical submersible pump comprises selectively operating the electrical submersible pump via an electrical cable coupled between the electrical submersible pump and a power source.

11. The method of claim 9, wherein the actuating comprises moving axially a sliding sleeve of the valve assembly against a valve member of the valve assembly, and moving the valve member into an open position.

12. The method of claim 11, wherein moving the valve member into an open position comprises rotating a flapper about a hinge.

13. The method of claim 9, wherein the actuating comprises withdrawing hydraulic fluid from the chamber of the valve assembly, thereby causing a sliding sleeve of the valve assembly to move axially and a valve element of the valve assembly to move to a closed position.

14. The method of claim 13, wherein the valve element of the valve assembly moves to a closed position by rotating a flapper about a spring-loaded hinge.

15. A submersible pump system comprising:
   a Y-tool system including a Y-Block having a production tubing branch, a submersible pump branch, and a bypass branch;
   an electrical submersible pump coupled to the submersible pump branch;
   a bypass tubing coupled to the bypass branch;
   a hydraulically actuated valve assembly disposed in the bypass tubing, the valve assembly comprising:
      a sliding sleeve; and
      a valve element positioned proximate a first end of the sliding sleeve, the valve element movable between a closed position and an open position in response to a movement of the sliding sleeve; and
   a hydraulic fluid system independent from the electrical submersible pump and coupled to the valve assembly via a hydraulic line.

16. The submersible pump system of claim 15, wherein the valve element is a flapper.

17. The submersible pump system of claim 16, further comprising a spring-loaded hinge coupled to the flapper.

18. The submersible pump system of claim 15, further comprising a hydraulic fluid chamber in fluid communication with the sliding sleeve.

19. The submersible pump system of claim 15, further comprising a power spring disposed around the sliding sleeve.

20. The submersible pump system of claim 15, wherein the hydraulically actuated valve assembly comprises a tubular disposed concentrically around the sliding sleeve, the sliding sleeve moveable relative to the tubular, and a hydraulic fluid chamber formed between the tubular and the sliding sleeve.

* * * * *